United States Patent
Cozianu et al.

(10) Patent No.: US 7,895,371 B2
(45) Date of Patent: Feb. 22, 2011

(54) SYSTEM AND METHOD FOR ON DEMAND LOGGING OF DOCUMENT PROCESSING DEVICE STATUS DATA

(75) Inventors: Costin Cozianu, Torrence, CA (US); George Koppich, Palos Verdes Estates, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1019 days.

(21) Appl. No.: 11/684,381

(22) Filed: Mar. 9, 2007

(65) Prior Publication Data

US 2008/0222186 A1    Sep. 11, 2008

(51) Int. Cl.
*G06F 3/00* (2006.01)

(52) U.S. Cl. .............. 710/19; 710/16; 710/18; 715/700

(58) Field of Classification Search .......... None
See application file for complete search history.

(56) References Cited

U.S. PATENT DOCUMENTS 6,622,266 B1 * 9/2003 Goddard et al. .......... 714/44
2004/0025006 A1 * 2/2004 Babka et al. ............ 713/100

* cited by examiner

*Primary Examiner*—Alan Chen
(74) *Attorney, Agent, or Firm*—SoCal IP Law Group LLP; Steven C. Sereboff; Jonathan Pearce

(57) ABSTRACT

The subject application is directed to a system and method for document processing device status logging. Status data is first received corresponding to operations of an associated document processing device. The received status data is then stored in a suitable storage location. A determination is then made whether a predefined interval occurred. When the interval has occurred, the stored data is deleted or overwritten. When a secondary memory device is received and recognized by the document processing device, the received status data is routed to the secondary memory device, whereupon the status data remains in the storage location until such time as the predefined interval has occurred. When the secondary memory device that was received by the document processing device is not detected or recognized, operations return to awaiting the elapse of the predefined interval or the detection of a recognizable secondary memory device.

18 Claims, 8 Drawing Sheets

SYSTEM AND METHOD FOR ON DEMAND LOGGING OF DOCUMENT PROCESSING DEVICE STATUS DATA

BACKGROUND OF THE INVENTION

The subject application is directed to a system and method for logging document processing device status data. More particularly, the subject application is directed to a system and method for logging the status of document processing devices at predefined intervals via a secondary memory device.

Document processing devices, such as printers, facsimile machines, or other document output devices, which provide a given document processing function, as well as multifunction peripherals that are capable of providing more than one document processing function, are constantly being improved relative to the array of available functions. Increased functionality is related to complexity of the device. As devices become more complex, there are more subsystems that may fail. These subsystems operate either alone, or in cooperation with others, to accomplish complex document processing operations. Since many systems are used, and are used in various combinations in accordance with a selected operation, it is difficult to diagnose problems that may periodically surface during operation. A failure of one subsystem is often difficult to separate from others with which it cooperates during an operation. Additionally, a similar symptom may be returned from more than one cause. A good understanding of a failure or other problem is required to allow for remedying a problem. With complex machinery, system administrators increasingly rely on system logs that are obtained by status or operational data accumulated during use.

Document processing devices, particularly those in a shared environment, such as an office, are often in frequent if not, continuous, operation. Acquisition of status data for all such usage can result in a staggering amount of information. However, such information is only needed in the event of a problem, as noted above. For this reason, in conventional systems, detailed logging or status data related to operations of a document processing device is typically stored in a plurality of circular buffers in the memory of the device. Such logging information is generally overwritten after a predetermined period of time.

SUMMARY OF THE INVENTION

In accordance with one embodiment of the subject application, there is provided a system and method for logging document processing device status data.

Further, in accordance with one embodiment of the subject application, there is provided a system and method for logging the status of document processing devices at predefined intervals via a secondary memory device.

Still further, in accordance with one embodiment of the subject application, there is provided a system and method for capturing all logging or status information for a document processing device.

Further, in accordance with one embodiment of the subject application, there is provided a system for logging document processing device status data. The system includes means adapted for receiving status data associated with operation of an associated document processing device and storage means adapted for storing received status data. The system further includes means adapted for deleting previously received status data after a defined interval and means adapted for receiving an associated secondary memory device. The system also comprises sensing means adapted for sensing receipt of an associated secondary memory device and routing means adapted for routing selected received status data to the associated secondary memory device in accordance with an output of the sensing means.

In one embodiment of the subject application, the defined interval corresponds to an interval defined from at least one item a set comprising capacity of the storage means, memory usage associated with stored status data, number of entries associated with stored status data, a selected storage duration, and a specified purge time.

In another embodiment of the subject application, the associated secondary memory device is comprised of a non-volatile data storage medium.

In yet another embodiment of the subject application, the system further comprises means adapted for receiving identification data associated with the secondary memory device and testing means adapted for testing authorization in accordance with received identification information. In this embodiment, the system also comprises means adapted for selectively enabling the routing means in accordance with an output of the testing means. Preferably, the identification data is stored within the non-volatile data storage medium.

In a further embodiment of the subject application, the sensing means includes means adapted for sensing the removal of the associated memory device. In this embodiment, the routing means includes means adapted for stopping routing of selected received status data to the secondary memory device in accordance with an output of the sensing means corresponding to the removal of the associated memory device.

Still further, in accordance with one embodiment of the subject application, there is provided a method for logging document processing device status data in accordance with the system as set forth above.

Other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for logging document processing device status data. In particular, the subject application is directed to a system and method for logging the status of document processing devices at predefined intervals via a secondary memory device. More particularly, the subject application is directed to a system and method for capturing all logging or status information for a document processing device. It will become apparent to those skilled in the art that the system and method described herein are suitably adapted to a plurality of varying electronic fields employing status logs, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
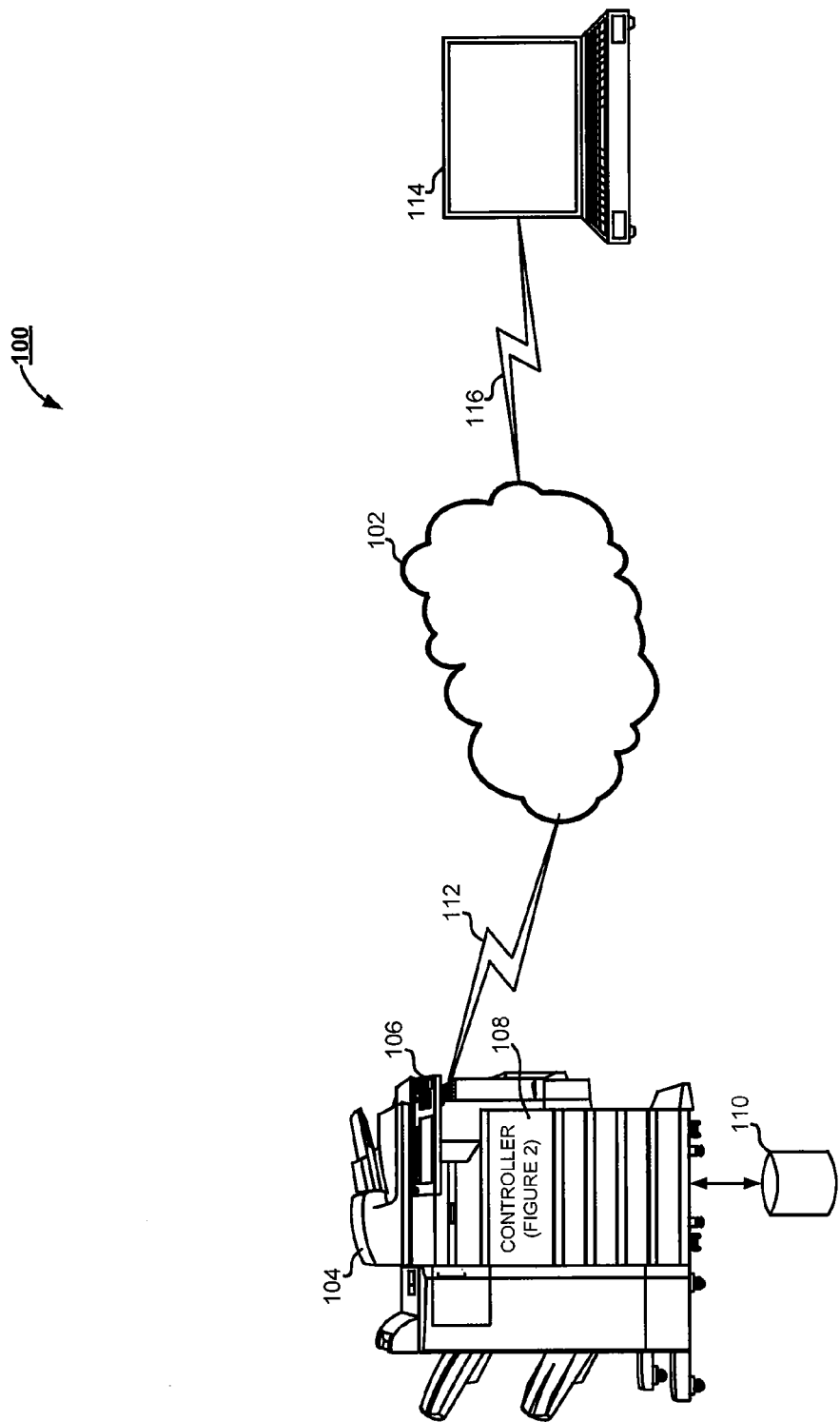
FIG. 1 is an overall diagram of the system for logging document processing device status data according to one embodiment of the subject application.

Referring now to FIG. 1, there is shown an overall diagram of the system 100 for logging document processing device status data in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. The functioning of the document processing device 104 will better be understood in conjunction with the block diagrams illustrated in FIGS. 2 and 3, explained in greater detail below.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communication network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for logging document processing device status data of the subject application. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any storage medium known in the art including, for example and without limitation, system memory (RAM), virtual system memory, magnetic storage drives, a hard disk drive, optical storage devices, flash memory devices, or any suitable combination thereof. In the preferred embodiment, the data storage device 110 is suitably adapted to store status data, log data, document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. In accordance with one embodiment of the subject application, the data storage device 110 includes log data representative of device status associated with document processing device 104. In accordance with a preferred embodiment of the subject application, the data storage device 110 is representative of one or more circular storage buffers, suitably adapted for storing logging information associated with the status of the document processing device 104. In accordance with one embodiment of the subject application, the status data associated with the document processing device is stored in the circular storage buffers of the data storage device 104 for a predefined interval. Upon occurrence of such an interval, selected status data is deleted. It will be appreciated by those skilled in the art that the predefined interval is capable of, but not limited to, an interval defined by the capacity of the storage location, memory usage associated with stored status data, number of entries associated with stored status data, a selected storage duration, a specified purge time, or the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102. In accordance with one embodiment of the subject application, the user device 114 employs a web browser application, enabling the monitoring and retrieval of document processing device status data via the computer network 102.

Figure 2:
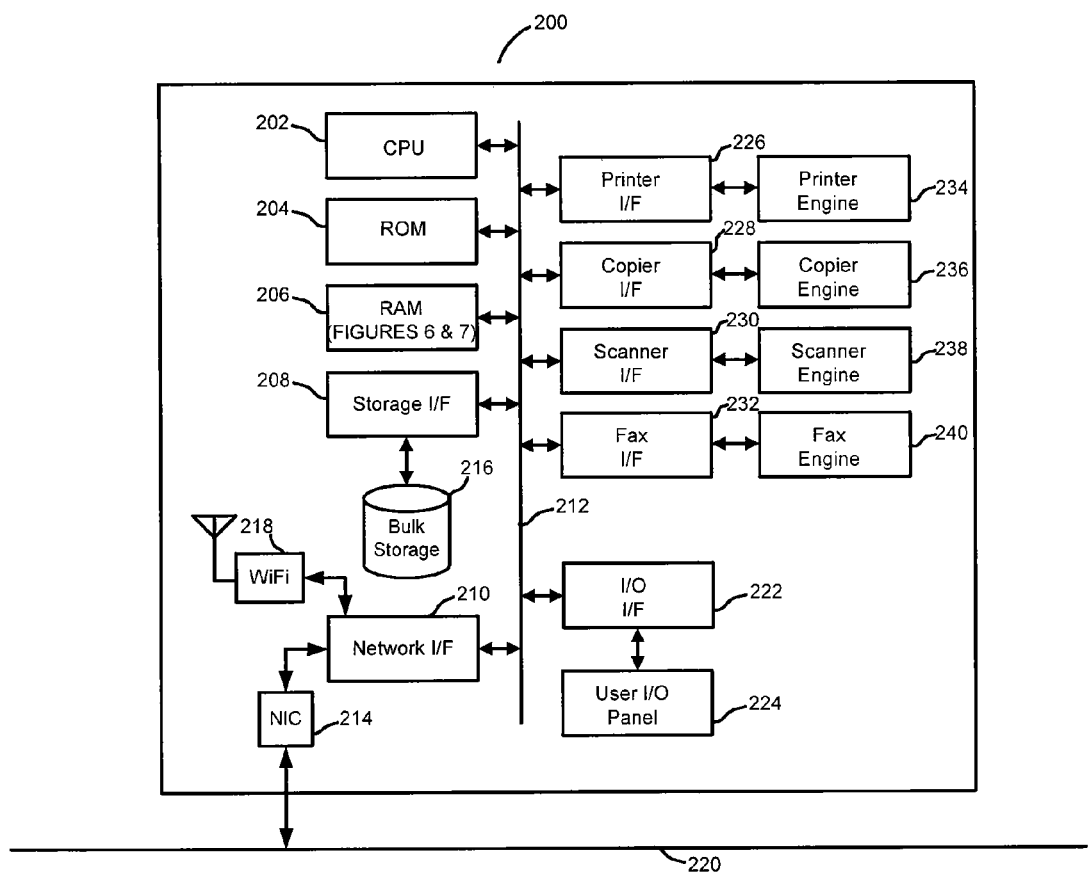
FIG. 2 is a block diagram illustrating device hardware for use in the system for logging document processing device status data according to one embodiment of the subject application.

Turning now to FIG. 2, illustrated is a representative architecture of a suitable device 200 (shown in FIG. 1 as the document processing device 104) on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the server 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
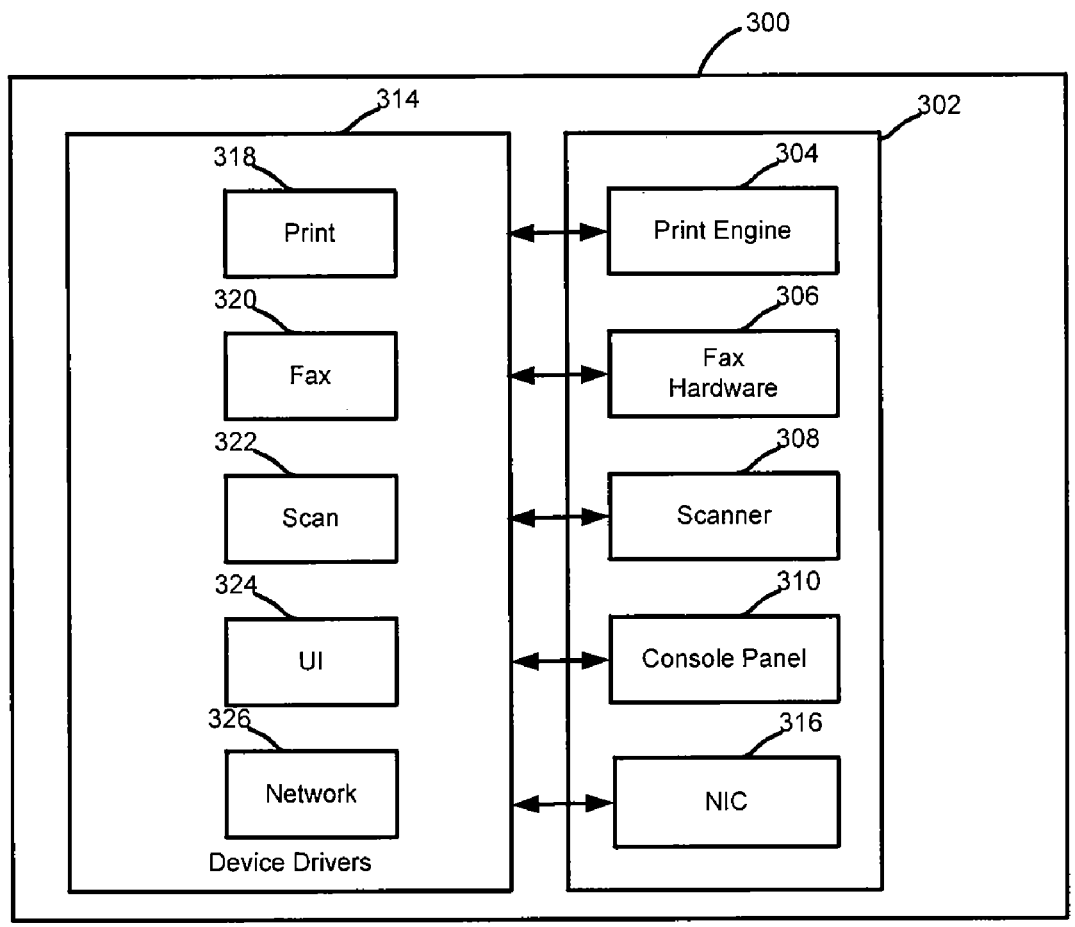
FIG. 3 is a functional diagram illustrating the device for use in the system for logging document processing device status data according to one embodiment of the subject application.

Turning now to FIG. 3, illustrated is a suitable document processing device for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
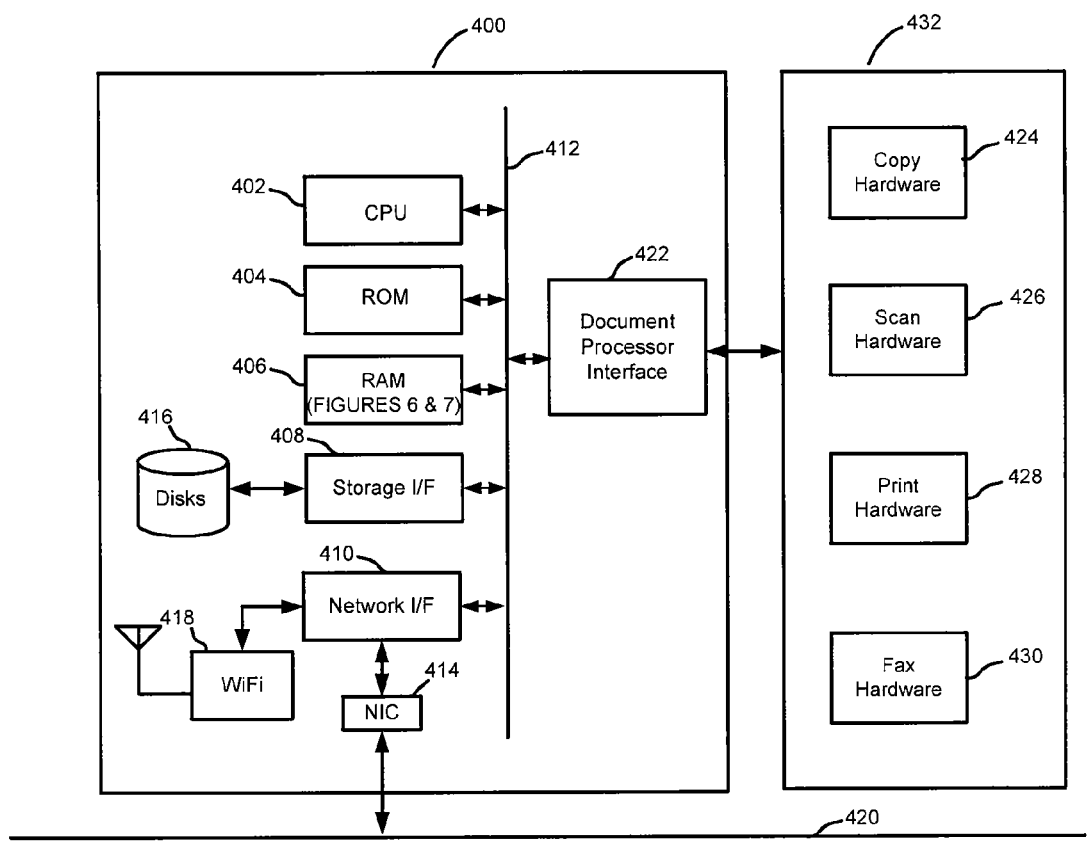
FIG. 4 is a block diagram illustrating controller hardware for use in the system for logging document processing device status data according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 108 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with bus the 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
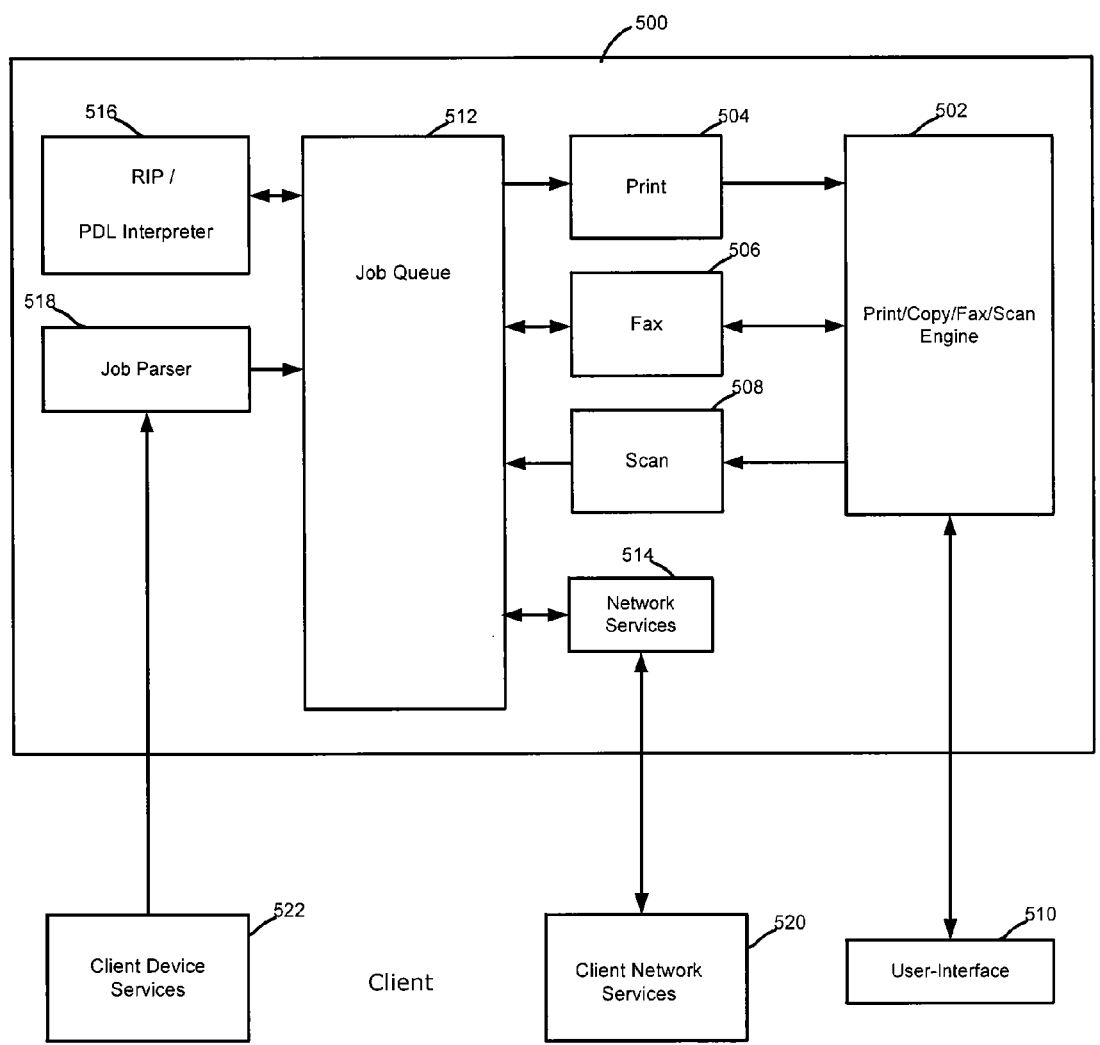
FIG. 5 is a functional diagram illustrating the controller for use in the system for logging document processing device status data according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are a subset of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

In operation, the controller 108, logging daemon, or other component associated with the document processing device 104 determines whether a secondary memory device has been received. It will be appreciated by those skilled in the art that suitable secondary memory devices include, for example and without limitation, XD, SD, CF, memory stick, USB drive, or other flash memory device, portable hard disk drive device, or other volatile or non-volatile portable memory device known in the art. Upon a determination that no secondary memory media is detected, the controller 108, logging daemon, or other suitable component points to a local storage, e.g., a location in a circular buffer on the associated data storage device 110.

The controller 108 or logging daemon, associated with the document processing device 104, then receives status data associated with operations of the document processing device 104. It will be appreciated by those skilled in the art that suitable status data is capable of including, for example and without limitation, software events, processor failure, system restarts, process failure, toner levels, paper levels, processing usage, resource levels, power consumption, operation utilizations, mechanical component wear, and the like. The skilled artisan will further appreciate that the quantity and type of data stored is capable of being defined by instructions received from an associated user, administrator, or the like. The controller 108 or other suitable component of the document processing device 104 then directs the storage of the received status data in the local storage location designated by a pointer. The local storage pointer is then updated to reflect the next subsequent storage location in the data storage device 110 for storage of status data.

A determination is then made whether a predefined interval has been completed. It will be appreciated by those skilled in the art that the predefined interval is capable of, but not limited to, corresponding to an interval defined by the capacity of the storage location, memory usage associated with stored status data, number of entries associated with stored status data, a selected storage duration, a specified purge time, or the like. When the predefined interval has been completed, the storage pointer is reset, i.e., the pointer is reset to reflect the first storage location, whereby newly received status data is written over the oldest received status data. In effect, as will be understood by those skilled in the art, the oldest previously received status data is deleted. For example, when the predefined interval corresponds to memory capacity, status data is routinely written to the memory in accordance with the logging daemon or the like. When the memory capacity has been reached, the previously stored, e.g., oldest status data, is deleted and the new status data is stored in the memory. The skilled artisan will appreciate that other factors are capable of influencing where the reset pointer points. For example, the pointer is capable of being reset to only direct newly received status data to overwrite previously stored status data that does not concern a particular document processing component, process, or the like, thereby retaining all status data associated with a specified component, process or the like.

When the predefined interval has not been completed and a secondary memory device, such as a Plug-and-Play writeable media has been received or inserted into the document processing device 104, a determination is made whether the secondary memory device is sensed, i.e., whether the document processing device 104 is able to access the inserted secondary memory device. When the memory device is not detected the logging daemon or controller 108 returns to waiting for the insertion of a suitable secondary memory device, and the process described above with respect to the local storage is repeated.

When the secondary memory device is detected and recognized by the daemon or controller 108, configuration data, inclusive of identification data and logging configuration data, stored on the secondary memory device is then received and read by the appropriate component of the document processing device 104. It will be appreciated by those skilled in the art that such identification data includes, for example and without limitation, an XML-based logging configuration file stored in the root of the secondary memory device's file system. It will be appreciated by those skilled in the art that a remote user, via the user device 114, is also capable of retrieving status data via the computer network 102 and a suitable web-browser or other client application. The received identification data is then tested to determine whether the identification is valid, i.e., whether the secondary memory device is capable of receiving status data. When no such validation is forthcoming, operations return to determining whether an acceptable secondary memory device has been received. When no such device is detected, status data is directed to the local circular storage buffers and operations continue as set forth above.

When the identification data is determined to be valid, the logging daemon, controller 108, or other suitable component of the document processing device 104 determines the particular status data requested. That is, the configuration file is analyzed to determine the type of logging data to be routed to the secondary memory device. For example, the configuration file on the secondary memory device is capable of including filtering criteria or logging level instructions, such as, status data related to a specific component, group of components, process, group of processes, or the system as a whole. Thus, those skilled in the art will appreciate that the type of status data, the quantity of status data, and the like, are configurable by an associated user or administrator. In accordance with one embodiment of the subject application, the user or administrator is also capable of selecting whether status data stored on the secondary memory device is collected and stored in real-time, directly from operations of the document processing device 104, or downloaded from circular storage buffers on the document processing device 104.

Once the status data, e.g., type, quantity, etc., to be stored on the secondary memory device is determined, the logging daemon, controller 108, or other suitable component of the document processing device 104 directs a pointer to a location on the secondary memory device wherein the status data is to be written. Status data is then received by the secondary memory device in accordance with the logging configuration data read from the configuration file. It will be appreciated by those skilled in the art that such status data is capable of being received from the circular storage buffers on the associated data storage device 110, received directly from the document processing device 104 as the status occurs, or the like. The received status data is then stored in the location designated by the pointer on the secondary memory device. The pointer is then updated by the logging daemon, controller 108, or other suitable component of the document processing device 104 to point to the next storage location on the secondary memory device to receive the next status data.

A determination is then made by the logging daemon, controller 108, or the like, as to whether a predefined interval has been completed. When the interval has not been completed, a determination is made whether the secondary memory device is still detected by the logging daemon, controller 108, or the like. For example, whether an error has occurred during the transfer of status data to the secondary memory device, whether the secondary memory device has been removed, or the like. When the secondary memory device is still present, from the point of view of the logging daemon or controller 108, the next type of status data is determined, or updated status data of a previously stored type is determined, and operations continue with routing status data to the location in the secondary memory device in accordance with the pointer. When the memory device is no longer detected by the logging daemon or controller 108, operations return to waiting for the detection of an acceptable secondary memory device and logging of status data in local memory, as set forth in greater detail above.

When the predefined interval has been completed, the storage pointer is reset, i.e., the pointer is reset to reflect the first storage location in the secondary memory device, whereby newly received status data is written over the oldest received status data. The skilled artisan will appreciate that the oldest data is overwritten, thereby resulting in the deletion of the oldest data. The skilled artisan will also appreciate that other factors are capable of influencing where the reset pointer points. For example, the pointer is capable of being reset to only direct newly received status data to overwrite previously stored status data that does not concern a particular document processing component, process, or the like, thereby retaining all status data associated with a specified component, process or the like.

In accordance with a further example embodiment of the subject application, a determination is first made whether a suitable secondary memory device has been sensed. Preferably, the determination is made by a logging daemon associated with the operating system of the document processing device 104, by a controller 108 associated with the document processing device 104, or another suitable component, hardware or software, associated with the document processing device 104. Suitable secondary memory devices include, for example and without limitation, flash memory, e.g., XD, SD, MMC, CF, volatile memory, e.g., RAM, non-volatile memory, e.g., hard disk drive, optical storage, or the like, or any suitable combination thereof. Preferably, the secondary memory device is a portable storage medium, capable of being accessed by the document processing device 104.

When it is determined that no secondary memory device is available, the logging daemon, controller 108, or other suitable component of the document processing device 104 determines, via a pointer, a storage location in local memory to store received status data. Preferably, the local memory includes circular storage buffers, such as those capable of being implement using the data storage device 110, document processing device 104 system memory, or the like. The pointer, as will be apparent to those skilled in the art, indicates the position in the local memory wherein the status data is to be stored. Status data corresponding to operations of the document processing device 104 is then received by the logging daemon, controller 108, or the like. As will be understood by those skilled in the art, suitable status data is capable of including, for example and without limitation, software events, processor failure, system restarts, process failure, toner levels, paper levels, processing usage, resource levels, power consumption, operation utilizations, mechanical component wear, and the like. It will be appreciated by those skilled in the art that an associated user, administrator, or the like is capable of selecting the quantity of data to be routed to storage, the type or types of data for which logging data is to be stored. The controller 108 or other suitable component of the document processing device 104 then directs the storage of the received status data in the local storage location designated by a pointer. The local storage pointer is then updated to reflect the next subsequent storage location in the data storage device 110 for storage of status data.

A determination is then made whether a predefined interval has been completed. It will be appreciated by those skilled in the art that the predefined interval is capable of, but not limited to, corresponding to an interval defined by the capacity of the storage location, memory usage associated with stored status data, number of entries associated with stored status data, a selected storage duration, a specified purge time, or the like. When the interval has been completed, the pointer is reset and operations continue as set forth above. That is, the pointer is reset to reflect the first storage location, whereby newly received status data is written over the oldest received status data. In effect, as will be understood by those skilled in the art, the oldest previously received status data is deleted. In accordance with one embodiment of the subject application, other factors are implemented to control where the reset pointer points. For example, the pointer is capable of being reset to only direct newly received status data to overwrite previously stored status data that does not concern a particular document processing component, process, or the like, thereby retaining all status data associated with a specified component, process or the like. When the interval has not been completed, operations return to determining whether a secondary memory device has been detected. If no device is detected, operations continue as set forth in greater detail above.

When a suitable secondary memory device is detected, the logging daemon, as notified by the operating system resident on the document processing device 104, the controller 108, or the like, points to a secondary memory storage location where status data is to be stored on the secondary memory device. Status data is then received and stored in the location designated by the pointer. In accordance with one embodiment of the subject application, an associated user or administrator is capable of selecting the quantity of status data to be downloaded to the secondary memory device, the type of status data downloaded, and the like. It will be appreciated by those skilled in the art that the status data is capable of being received from the circular storage buffers of the data storage device 110, in real-time directly from the controller 108 associated with the document processing device 104, or the like. The pointer is then updated, or incremented, so as to point to the next storage location to be used for storing additional status data.

A determination is then made whether a predefined interval has been completed. When the interval has been completed, the pointer associated with the secondary memory is reset and operations continue as set forth above. When the interval has not been completed, operations continue as set forth above with respect to the storing of status data.

In accordance with a further embodiment of the subject application, the document processing device 104 employs a software component, such as a central logging daemon, to which all levels of status and logging information are communicated. It will be appreciated by those skilled in the art that the UNIX syslog daemon is suitable example, however the syslog daemon requires a storage destination for the logging information that exists for the duration of a logging operation.

Preferably, the detailed logging information is stored in several circular buffers in memory, such as the data storage device 110 or system memory of the document processing device 104, whereupon it is overwritten, i.e., lost or erased, after predefined interval. It will be appreciated by those skilled in the art that the predefined interval is capable of including, for example and without limitation, a predetermined a period of time, buffer storage capacity, memory usage, number of entries associated with stored data, a specified purge time, or the like. Thus, it will be appreciated by those skilled in the art that the normal functioning of the document processing device 104 is not hindered, as the overhead, i.e., resource usage, of the logging activities is negligible.

The daemon then monitors the document processing device 104 to determine when the logged status data is required. Preferably, this determination is made when a USB hard drive or any other form of Plug-and-Play writeable media, e.g., SD/XD/CF card, is attached to the document processing device 104 containing an appropriate XML-based logging configuration file stored in the root of the device's file system. In accordance with such an embodiment, the XML logging configuration file contains the parameters desired for logging, such as, for example and without limitation, an authorization key to be examined by the daemon certifying the legitimacy of the logging request, the desired level of logging or other filtering criteria, e.g., logging pertaining to a specified component of the document processing device 104, set of components, the device 104 as a whole, specific document processing operations, or the like.

Upon receipt of such a secondary memory, the logging daemon is notified by the operating system of the document processing device 104 of the detection of Plug-and-Play writeable media. Thereupon, the daemon validates the information in the XML configuration file. As a result of the detection, the current status or log information residing in the one or more circular buffers matching the supplied criteria is no longer overwritten but it is written using asynchronous I/O to the media. Thus, the skilled artisan will appreciate that without any reconfiguration of the running software system, detailed logging data is capable of being recovered without interruption of the system activity.

In accordance with another example embodiment of the subject application, the central logging daemon architecture, as referenced in the previous example, is capable of replacement by decentralized logging libraries, which are each bound to one of the processes running on the associated document processing device 104. According to such an embodiment, each library performs the same algorithm as the central logging daemon, with regards to the detection and transfer of status data to Plug-and-Play writeable media.

It will be appreciated by those skilled in the art that the Plug-and-Play writeable media is capable of being generalized with any suitable auto-detectable writeable I/O channel, known in the art, corresponding in pair with the configuration information. Thus, the central logging daemon or the per process bound logging libraries detect the presence of the pair (writeable channel, logging configuration information), read the configuration information, and begin writing the circular buffers to the I/O channel.

For example, in a Web Services scenario for windows, the user, via the user device 114, needing to recover logging information from the document processing device 104, accesses the device 104 over the computer network 102 via web browser or a client program, a predefined URL giving as input the logging parameters. The software or other component associated with the document processing device 104 handling the URL then signals the request by creating a pair of named pipes with predefined global names. On one pipe the Web software will write the logging parameters, on the other pipe the web software will read the logging information being dumped from the circular buffers and write it further on the HTTP output stream for the web browser/web service client associated with the remote user device 114.

In operation according to a general embodiment of the subject application, status data is first received associated with operations of an associated document processing device 104. The received status data is then stored in a suitable storage location, such as the data storage device 110. The controller 108 or other suitable component associated with the document processing device 104 then determines whether a predefined interval occurred. Preferably, the predefined interval corresponds to an interval defined by the capacity of the storage location, memory usage associated with stored status data, number of entries associated with stored status data, a selected storage duration, a specified purge time, or the like. In accordance with one embodiment of the subject application, when the interval has occurred, previously received stored data is deleted from storage location. When the interval has not occurred, the document processing device 104 then receives a secondary memory device. When the memory device is detected by the document processing device 104, selected received status data is routed to the secondary memory device. Thereafter, operations return to monitoring and receiving status data corresponding to operations of the associated document processing device 110. When the secondary memory device that was received by the document processing device 104 is not detected or recognized, operations return to the monitoring and receiving of status data corresponding to operations of the associated document processing device 110.

Figure 6:
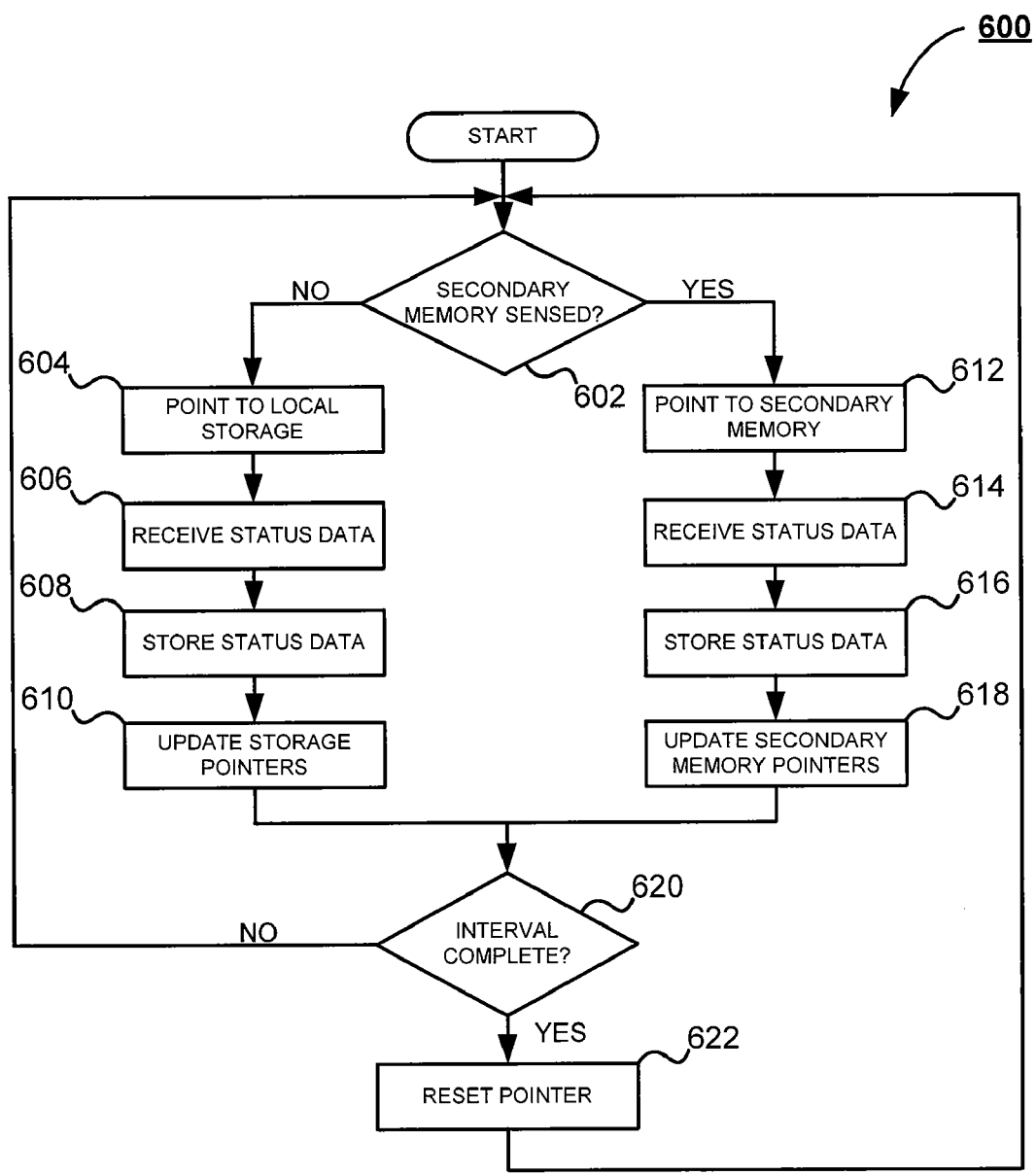
FIG. 6 is a flowchart illustrating a method for logging document processing device status data according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6, FIG. 7, and FIG. 8. With respect now to FIG. 6, there is shown a flowchart 600 illustrating a method for logging document processing device status data in accordance with one embodiment of the subject application. Beginning at step 602, a determination is made whether a secondary memory device is sensed. When no secondary memory device is detected, by, for example the operating system of the document processing device 104, flow proceeds to step 604, whereupon a logging daemon, controller 108, or other suitable component associated with the document processing device 104 accesses a pointer corresponding to a location in local storage, e.g., a circular buffer in the system memory or on the data storage device 110, for storing status data.

At step 606, status data corresponding to operations of the associated document processing device 104, is received by the logging daemon, controller 108, or the like. It will be appreciated by those skilled in the art that suitable status data includes, for example and without limitation, software events, processing usage, processor failure, system restarts, toner levels, paper levels, mechanical component wear, power consumption, resource levels, and the like. The skilled artisan will further appreciate that the quantity and/or type of status data is capable of being selected by an associated user or administrator prior to storage thereof by the logging daemon. Thereafter, the received status data is stored in a local storage location as directed by the pointer at step 608. At step 610, the pointer is updated so as to direct the next received status data to be stored in a subsequent local storage location. Flow then proceeds to step 620, whereupon a determination is made whether a predefined interval has been completed. That is, the logging daemon, controller 108, or other suitable component associated with the document processing device 104 determines whether a predefined interval has been completed. As set forth above, a predefined interval includes, for example and without limitation, an interval is set in accordance with a capacity of memory for storage of status data. In such an embodiment, once the memory is fully used, newly received status data is written over the oldest status data in memory. When the interval has been completed, flow proceeds to step 622, wherein the pointer is reset and operations return to step 602. It will be understood by those skilled in the art that the resetting of the pointer corresponds to enabling the next status data received by the daemon or controller 108 to overwrite the oldest or other designated previously stored status data. When the interval has not been completed, operations return to step 602, and the method continues thereon.

Returning to step 602, when a secondary memory device is detected by the daemon, controller 108, or other suitable component of the document processing device 104, flow proceeds to step 612, wherein the location of the storage location is pointed to by a pointer associated with the secondary memory device. That is, the pointer points to a location on the secondary memory where status data is to be stored. At step 614, status data corresponding to an operation of the document processing device 104 is received by the daemon or controller 108. Thereafter, the received status data is stored at step 616 in the storage location specified by the pointer. It will be appreciated by those skilled in the art that the status data is capable of being received from an ongoing document processing operation, i.e., in real-time, from status data stored in the circular buffers of memory on the document processing device 104, or the like. The pointer is then updated at step 618 to point to the next storage location on the secondary memory device to store status data. Flow then proceeds to step 620, wherein the determination is made whether a predefined interval, as explained above, has been completed. The pointer is reset at step 622 when the interval has been completed and operations return to step 602. Otherwise, operations return directly to step 602.

Figure 7:
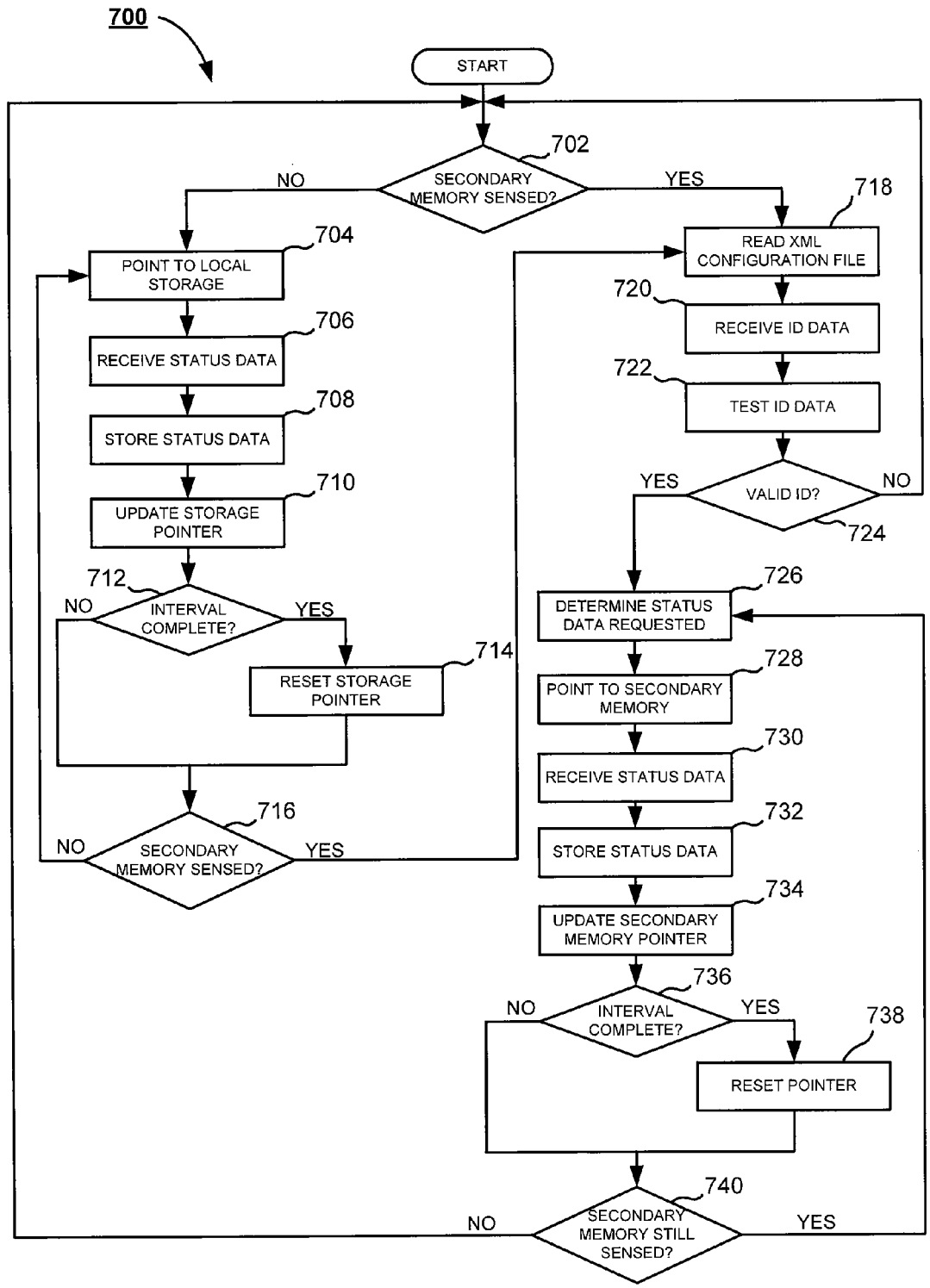
FIG. 7 is a flowchart illustrating a method for logging document processing device status data according to one embodiment of the subject application.

Referring now to FIG. 7, there is shown a flowchart 700 illustrating an example implementation of the method for logging document processing device status data in accordance with one embodiment of the subject application. It will be appreciated by those skilled in the art that the method depicted in FIG. 7 illustrates additional operations that are performed in accordance with this example implementation. Accordingly, the method illustrated in the flowchart 700 of FIG. 7 begins at step 702, a determination is made by an operating system resident on the document processing device 104, a logging daemon associated with the document processing device 104, the controller 108, or other suitable component of the document processing device 104, whether a secondary memory device is detected. Suitable secondary memory devices include, for example and without limitation volatile memory, non-volatile memory, such as XD/SD/CF memory cards, USB storage drives, other Plug-and-Play storage devices, or the like.

The daemon, controller 108, or other suitable component of the document processing device 104 then ascertains, at step 704, a storage location, based on a local storage pointer, for storing status data in an associated storage. Suitable associated storage includes, for example and without limitation, flash memory, magnetic storage devices, optical storage devices, and the like. Preferably, the storage location is one or more circular buffers adapted to store status data. Once the proper location has been ascertained, flow proceeds to step 706, whereupon status data corresponding to operation of an associated document processing device 104 is received by the logging daemon, controller 108, or other hardware or software component associated with the document processing device 104. In accordance with one embodiment of the subject application, suitable status data includes, for example and without limitation, toner levels, paper levels, processing usage, resource levels, power consumption, operation utilizations, mechanical component wear, and the like. The skilled artisan will further appreciate that the quantity and/or type of status data is capable of being selected by an associated user or administrator prior to storage thereof by the logging daemon. The received status data is then stored, at step 708, in the one or more circular buffers resident on memory associated with the document processing device 104, e.g., system RAM, the data storage device 110, or the like. Once this data has been stored, the storage pointer is updated at step 710 to correspond to the next available storage location in the associated storage device, e.g., the circular buffers.

A determination is then made at step 712 whether a predefined interval has been completed, the completion of which prompts overwriting or deletion of stored data. In accordance with one embodiment of the subject application, a predefined interval corresponds to an interval defined from the capacity of the storage, the memory usage associated with stored status data, the number of entries associated with stored status data, a selected storage duration, a specified purge time, and the like. When the predefined interval has been completed, flow proceeds to step 714, whereupon the storage pointer is reset, so as to reflect the storage location of previously received status data. In accordance with one embodiment of the subject application, the storage location is determined based upon the length of time previously received status data has been stored, the type of status data stored, or other predetermined priorities, as will be appreciated by those skilled in the art. The skilled artisan will further appreciate that such an action results in the overwriting, or deletion, of previously stored status data to make room for new status data.

Once the storage pointer has been reset, or when the interval has not been completed, flow progresses to step 716, whereupon a determination is made whether a secondary memory device has been detected. When no memory device is detected, flow returns to step 704, whereupon the next storage location is ascertained for storing status data, as set forth above. When a secondary memory device is detected, either at step 716 or step 702, flow proceeds to step 718, whereupon a configuration file, resident on the secondary memory device, is read by the logging daemon, controller 108, or other suitable component associated with the document processing device 104. Preferably, this configuration file includes identification data, such as, for example and without limitation, an XML-based logging configuration file stored in the root of the secondary memory device's file system, as well as a desired level of logging or other filtering criteria, e.g., logging pertaining to a specified component, group of components, a specified type of process, group of processes, or the like. In accordance with another embodiment of the subject application, a remote user, via the user device 114, is also capable of retrieving status data via the computer network 102 and a suitable web-browser or other client application.

Once the configuration file is read, flow proceeds to step 720, whereupon identification data stored on the secondary memory device is received by the document processing device 104. At step 722, the received identification data is tested to determine whether the identification is valid, i.e., whether the status data should be transferred to the secondary memory device. When it is determined at step 724 that the identification data received from the secondary memory device is invalid, operations return to step 702. When the identification is valid, flow proceeds to step 726, whereupon a determination is made, based on the configuration file, the type of status data to be stored, the quantity of data to be stored, whether the data is to be collected in real-time, whether the data is to be transferred from the circular storage buffers, or the like. Once this has been determined, the location on the secondary memory to store the status data is ascertained via a secondary memory pointer at step 728.

Upon determination of the correct memory location, flow proceeds to step 730, whereupon status data is routed to and received by the secondary memory device. The received status data is then stored in the memory location at step 732, as set by the pointer. The secondary memory pointer is then updated at step 734, to reflect that the previous memory position has status data stored and the location of the next memory location on the secondary memory device for storing additional status data. A determination is then made at step 736 whether a predefined interval has been completed. Preferably, the predefined interval corresponds to an interval defined from the capacity of the storage, the memory usage associated with stored status data, the number of entries associated with stored status data, a selected storage duration, a specified purge time, and the like. When the predefined interval has been completed, flow proceeds to step 738, whereupon the secondary memory storage pointer is reset, so as to reflect the storage location of previously received status data, as set forth in greater detail above. After resetting of the pointer, or when the interval has not been completed, flow proceeds to step 740.

At step 740, a determination is made whether the secondary memory device is still detected. That is, a determination is made whether the secondary memory device has been removed or an error has occurred rendering the secondary memory device inaccessible. When the secondary memory device is no longer available for receipt of status data, operations return to step 702, and the method progresses as set forth above. When the secondary memory device remains active and accessible for receiving status data, flow returns to step 726, whereupon the type of the next batch of status data to be transferred to and stored on the secondary memory device is determined. Operations continue thereon until the secondary memory device is removed, or the operation terminated.

Figure 8:
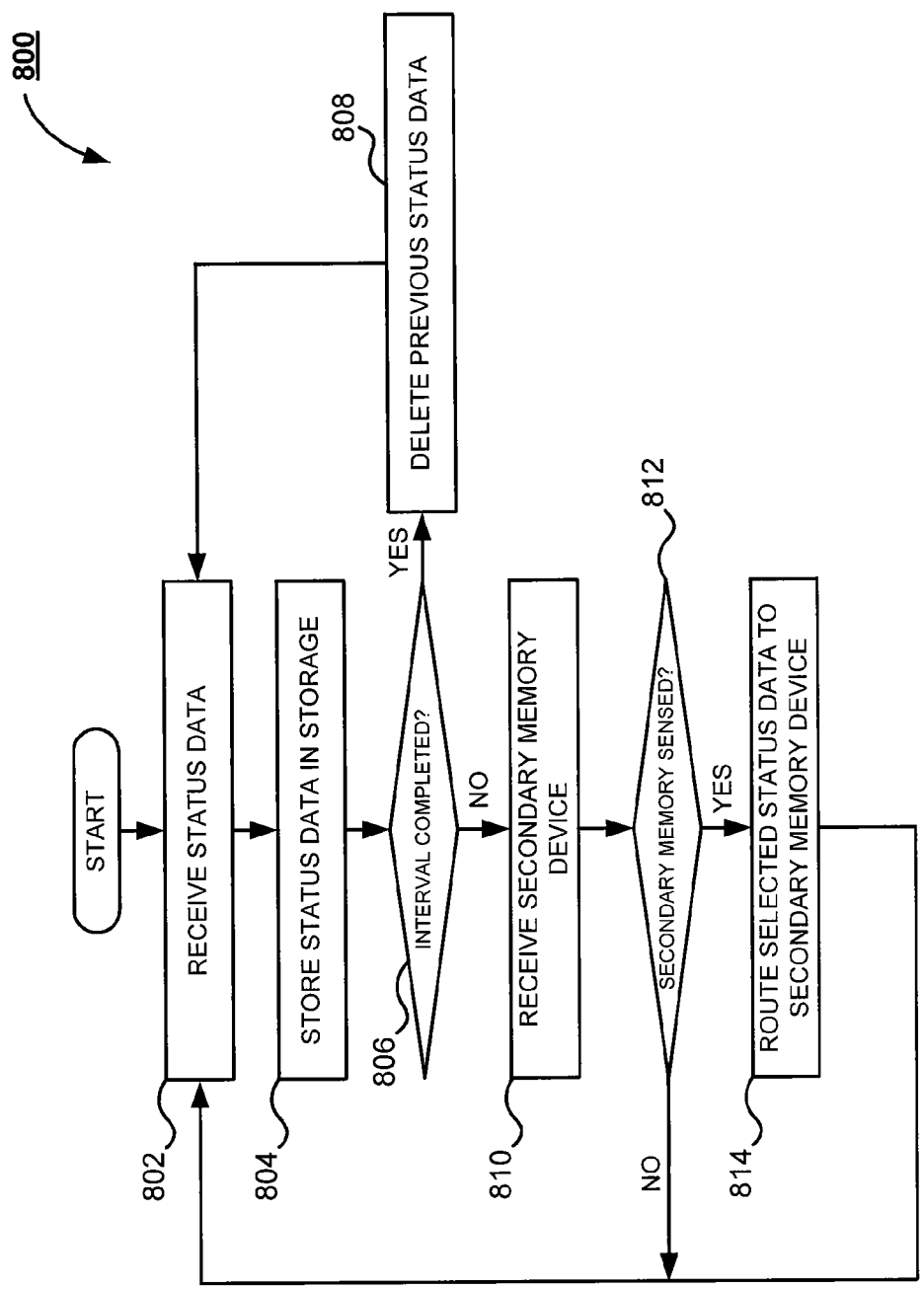
FIG. 8 is a flowchart illustrating a method for logging document processing device status data according to one embodiment of the subject application.

Turning now to FIG. 8, there is shown a flowchart 800 illustrating a method for logging document processing device status data in accordance with one embodiment of the subject application. Beginning at step 802, status data associated with operation of an associated document processing device 104 is first received. It will be appreciated by those skilled in the art that suitable status data is capable of including, for example and without limitation, toner levels, paper levels, processing usage, resource levels, power consumption, operation utilizations, mechanical component wear, and the like. The received status data is then stored, at step 804, in storage means, such as, for example and without limitation, non-volatile memory, volatile memory, or a combination thereof. At step 806, a determination is made whether a predefined interval has been completed. When the predefined interval has been completed, the previously received status data is deleted at step 808, whereupon operations return to step 802. In a preferred embodiment of the subject application, an interval is set in accordance with a capacity of memory for storage of status data. In such an embodiment, once the memory is fully used, newly received status data is written over the oldest status data in memory.

When the predefined interval has not been completed, flow progresses to step 810, whereupon a secondary memory device is received. A determination is then made at step 812 whether the secondary memory device has been detected by the document processing device 104. Preferably, the document processing device 104 via the controller 108 or other suitable hardware/software component, senses the secondary memory device and determines whether the device is to be used for log status data transfer. When no such indication is made at step 812, operations return to step 802. When the secondary memory device is detected at step 812, flow proceeds to step 814, whereupon selected received status data is routed to the secondary memory device. Thereafter, operations return to step 802, whereupon status data corresponding to document processing operations is received. It will be appreciated by those skilled in the art that in accordance with one embodiment of the subject application, upon completion of the transfer of the status data to the secondary memory device, the status data is deleted, whereupon operations return to monitoring and receipt of new status data at step 802. Thus, the skilled artisan will appreciate that the status data is stored on the storage device 110 in a circular buffer, and is selectively dumped or transferred to a secondary memory upon validation of that secondary memory.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A document processing device status logging system comprising:
   means adapted for receiving status data associated with operation of an associated document processing device;
   storage means adapted for storing received status data;
   means adapted for deleting previously received status data after a defined interval;
   means adapted for receiving an associated secondary memory device;
   means adapted for receiving instruction data corresponding to at least one selected status type selected from a plurality thereof;
   sensing means adapted for sensing receipt of an associated secondary memory device; and
   routing means adapted for routing selected received status data to the associated secondary memory device in accordance with an output of the sensing means and the instruction data.

2. The document processing device status logging system of claim 1 wherein the defined interval corresponds to an interval defined from at least one item a set comprising capacity of the storage means, memory usage associated with stored status data, number of entries associated with stored status data, a selected storage duration, and a specified purge time.

3. The document processing device status logging system of claim 1 wherein the associated secondary memory device is comprised of a non-volatile data storage medium.

4. The document processing device status logging system of claim 3 further comprising:
   means adapted for receiving identification data associated with the secondary memory device;
   testing means adapted for testing authorization in accordance with received identification information; and
   means adapted for selectively enabling the routing means in accordance with an output of the testing means.

5. The document processing device status logging system of claim 4 wherein the identification data is stored within the non-volatile data storage medium.

6. The document processing device status logging system of claim 1 further comprising:
   the sensing means including means adapted for sensing removal of the associated memory device; and
   the routing means including means adapted for stopping routing of selected received status data to the secondary memory device in accordance with an output of the sensing means corresponding to removal of the associated memory device.

7. A method for logging document processing device status data comprising the steps of:
   receiving status data associated with operation of an associated document processing device;
   storing received status data in a storage means;
   deleting previously received status data after a defined interval;
   receiving an associated secondary memory device;
   receiving instruction data corresponding to at least one selected status type selected from a plurality thereof;
   sensing receipt of an associated secondary memory device; and
   routing selected received status data to the associated secondary memory device in accordance with an output of the step of sensing receipt of the secondary memory device and the instruction data.

8. The method for logging document processing device status data of claim 7 wherein the defined interval corresponds to an interval defined from at least one item a set comprising capacity of the storage means, memory usage associated with stored status data, number of entries associated with stored status data, a selected storage duration, and a specified purge time.

9. The method for logging document processing device status data of claim 8 wherein the associated secondary memory device is comprised of a non-volatile data storage medium.

10. The method for document processing device status data of claim 9 further comprising the steps of:
    receiving identification data associated with the secondary memory device;
    testing authorization in accordance with received identification information; and
    selectively enabling routing of the selected received status data in accordance with an output of the testing authorization.

11. The method for logging document processing device status data of claim 10 wherein the identification data is stored within the non-volatile data storage medium.

12. The method for logging document processing device status data of claim 7 wherein:

the step of sensing receipt of the secondary memory device includes sensing removal of the associated memory device; and the step of routing selected received status data includes stopping routing of selected received status data to the secondary memory device in accordance with an output of the sensing step corresponding to removal of the associated memory device.

13. A computer-implemented method for logging document processing device status data comprising the steps of:

receiving status data associated with operation of an associated document processing device;

storing received status data in a storage means;

deleting previously received status data after a defined interval;

receiving an associated secondary memory device;

receiving instruction data corresponding to at least one selected status type selected from a plurality thereof;

sensing receipt of an associated secondary memory device; and routing selected received status data to the associated secondary memory device in accordance with an output of the step of sensing receipt of the secondary memory device and the instruction data.

14. The computer-implemented method for logging document processing device status data of claim 13 wherein the defined interval corresponds to an interval defined from at least one item a set comprising capacity of the storage means, memory usage associated with stored status data, number of entries associated with stored status data, a selected storage duration, and a specified purge time.

15. The computer-implemented method for logging document processing device status data of claim 13 wherein the associated secondary memory device is comprised of a non-volatile data storage medium.

16. The computer-implemented method for document processing device status data of claim 15 further comprising the steps of:

receiving identification data associated with the secondary memory device;

testing authorization in accordance with received identification information; and selectively enabling routing of the selected received status data in accordance with an output of the testing authorization.

17. The computer-implemented method for logging document processing device status data of claim 16 wherein the identification data is stored within the non-volatile data storage medium.

18. The computer-implemented method for logging document processing device status data of claim 13 wherein:

the step of sensing receipt of the secondary memory device includes sensing removal of the associated memory device; and the step of routing selected received status data includes stopping routing of selected received status data to the secondary memory device in accordance with an output of the sensing step corresponding to removal of the associated memory device.

* * * * *